United States Patent
Shekar (10) Patent No.: US 7,788,282 B2
(45) Date of Patent: Aug. 31, 2010

(54) METHODS AND COMPUTER PROGRAMS FOR DATABASE STRUCTURE COMPARISON

(75) Inventor: Ravi Shekar, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 10/943,064

(22) Filed: Sep. 16, 2004

(65) Prior Publication Data

US 2006/0069688 A1  Mar. 30, 2006

(51) Int. Cl.
*G06F 17/30* (2006.01)
(52) U.S. Cl. .................................................. 707/796
(58) Field of Classification Search .................. 707/101
See application file for complete search history.

(56) References Cited

U.S. PATENT DOCUMENTS

| | | | | |
|---|---|---|---|---|
| 5,696,898 | A * | 12/1997 | Baker et al. ................... | 726/12 |
| 5,717,924 | A * | 2/1998 | Kawai ......................... | 707/102 |
| 6,275,954 | B1 * | 8/2001 | Herman et al. ................ | 714/25 |
| 6,643,649 | B2 | 11/2003 | Wang et al. .................... | 707/9 |
| 6,839,714 | B2 * | 1/2005 | Wheeler et al. .............. | 707/102 |
| 6,985,905 | B2 * | 1/2006 | Prompt et al. ................ | 707/102 |
| 2002/0178438 | A1 | 11/2002 | Arbouzov et al. ........... | 717/148 |
| 2002/0198868 | A1 | 12/2002 | Kinzhalin et al. ............ | 707/3 |
| 2003/0028555 | A1 | 2/2003 | Young et al. ................. | 707/204 |
| 2003/0084075 | A1 | 5/2003 | Balogh et al. ................ | 707/204 |
| 2003/0131025 | A1 * | 7/2003 | Zondervan et al. ........... | 707/200 |
| 2003/0139920 | A1 | 7/2003 | Abir .............................. | 704/2 |
| 2003/0154216 | A1 | 8/2003 | Arnold et al. ............. | 707/104.1 |
| 2003/0177119 | A1 | 9/2003 | Cole ............................. | 707/7 |
| 2003/0187816 | A1 | 10/2003 | Jardin .......................... | 707/1 |
| 2003/0195878 | A1 | 10/2003 | Neumann ..................... | 707/3 |
| 2003/0200212 | A1 | 10/2003 | Benson et al. ................ | 707/7 |
| 2003/0208481 | A1 | 11/2003 | Neumann ..................... | 707/3 |
| 2003/0220920 | A1 * | 11/2003 | Lake et al. .................... | 707/6 |

OTHER PUBLICATIONS

Lerner. A Model for Compound Type Changes Encountered in Schema Evolution. Mar. 2000. ACM. ACM Transactions on Database Systems, vol. 25, No. 1. Mar. 2000. pp. 92-108. <http://portal.acm.org/citation.cfm?id=352983&coll=ACM&dl=ACM&CFID=8317069&CFTOKEN=93657554>.*

(Continued)

*Primary Examiner*—Neveen Abel Jalil
*Assistant Examiner*—Farhan M Syed
(74) *Attorney, Agent, or Firm*—Sughrue Mion, PLLC (57) ABSTRACT

Methods and computer programs for comparing database structures such as database schemas and descriptions of application programming interfaces are disclosed. The methods involve identifying incompatibilities between information repositories such as relational databases and byte code repositories by extracting a first database structure from a first information repository, extracting a second database structure from a second information repository, filtering relevant sections from each database structure, asymmetrically comparing the relevant sections, and identifying any incompatibilities between database schemas or byte code repositories.

27 Claims, 2 Drawing Sheets

OTHER PUBLICATIONS

Formatted Code Comparison. Mar. 1, 1993. IBM. vol. 36, . Issue 3. pp. 1-4.*

Java 2 Platform Standard Edition version 1.3. Package java.lang.reflect, Class Method, Class AccesibleObject. Aug. 16, 2000. Sun Microsystems. All pages. <http://java.sun.com/j2se/1.3/docs/api/java/lang/reflect/package-summary.html>.*

*IBM DB2 Object Comparison Tool for z/OS, Version 2*, IBM Corporation (2002).

Mark Sullivan and Ram Chillarege, *A Comparison of Software Defects in Database Management Systems and Operating Systems*, 475-84, University of California/IBM Thomas J. Watson Research Center (1992).

* cited by examiner

METHODS AND COMPUTER PROGRAMS FOR DATABASE STRUCTURE COMPARISON

FIELD

The present teaching relates to methods and computer programs for comparing database schemas and/or comparing libraries or repositories of byte codes.

BACKGROUND

The use of computer-implemented databases and application programming interfaces ("APIs") is now fundamental in the archival and use of various types of information, such as relational databases and program code libraries. Data structures that provide the data definitions for relational databases and APIs are referred to herein generally as "database structures" and include but are not limited to data descriptions of database schemas for relational databases, for example, and APIs, for example, in JAVA archive databases ("JARs"). As a result of their ubiquity, database structures comprise primary elements of a wide array of software packages and are instrumental in many aspects of compiling, cataloging, sorting, and retrieving information and for controlling aspects of program execution. However, the use of upgraded database structures is often limited by problems encountered when upgrading or changing the database structures or software designs. Specifically, a fully functional database system or other application that properly functions under an original database structure often fails to function under an upgraded database structure due to changes within the database structure. Similarly, software or applications that rely upon an original database structure for functional or operational support often fail to function properly under an upgraded database structure due to changes within the design of the database structure. Moreover, when the upgraded data includes a library of byte codes, such as a JAR, incompatibilities in the upgraded JAR can cause operating problems in the preexisting application. Thus, every time an original database structure is upgraded there is a risk that databases or applications which functioned under the original database structure will not function properly under the upgraded database structure.

For instance, if a DB2 database functions properly under a first set of database definitions it may not function at all if the DB2 database is upgraded to utilize an upgraded set of definitions which vary in some respect from the first set of definitions.

Similar problems exist when upgrading JARs, which include a plurality of APIs. Specifically, an application may function properly under a first JAR which utilizes a first set of APIs but not function at all under a second JAR which utilizes a second set of APIs that vary in some respect from the first set, such as by changing class constructors or method signature information including, for example, the number and order of arguments.

Existing methods are known for comparing database structures, including database schemas, JARs, APIs, and other data structures, but these conventional methods lack the ability to specifically identify the important differences between the two database structures. For example, a conventional method may identify that two database schemas are different, but cannot identify how they are different such that a database may be changed to function accordingly. By way of another example, known methods involve completely decompiling two JARs and comparing the two decompiled outputs. However, such comparisons fail to provide useful information about the relevant differences between the two JARs. Thus, known database structure comparison methods are unable to identify the forward and backward compatibility of two database structures in a particular application.

Additionally, known methods lack accurate comparison means and often inaccurately generate a plurality of non-existent incompatibilities based on an inaccurate comparison. For instance, known database structure comparison methods utilize standard symmetrical comparison which compares two database structures character by character or line by line to determine if the two structures are the same. Thus, two database structures may be functionally identical, but if one database includes an extra embedded white space, or any other element that is not dependent on the database structure and that is not relevant to the database structure, conventional comparison methods would identify the two database structures as being different. Similarly, two database structures may be functionally equivalent by containing identical components, but conventional comparison methods would identify the two database structures as being different if the components are positioned at different locations within each database structure.

SUMMARY

In various embodiments, the present teachings provide methods and computer programs that are capable of identifying the structural differences between two databases.

In various embodiments, the present teachings provide methods and computer programs that are capable of accurately comparing two database structures by comparing only relevant portions of the database structures.

In various embodiments, the present teachings provide methods and computer programs that are capable of comparing two database structures such that the location of segments within each database structure does not effect the results of the comparison.

It should be understood that the above-listed advantages need not all be accomplished by the invention claimed herein. Further advantages of the present invention will be apparent from the detailed description of the preferred embodiment, the claims, and the drawing figures.

Accordingly, in various embodiments, methods are provided for comparing database structures. The database comparison methods comprise extracting a first database structure from a first information repository, extracting a second database structure from a second information repository, filtering structure independent data from each database structure, asymmetrically comparing the first database structure and second database structure, and identifying incompatibilities between the first information repository and the second information repository based on the comparison.

In various embodiments, a method for comparing database structures is provided. The method involves extracting a first schema from a first relational database including a first plurality of relevant sections. Next a second schema is extracted from a second relational database, including a second plurality of relevant sections. Then relevant data from the first and second schemas is filtered by identifying relevant sections within the first and second schemas and disregarding irrelevant sections. Next, the identified relevant sections of the first and second schemas are asymmetrically compared to identify relevant differences included within one schema but not another, where a position of the relevant sections within the first and second schemas does not effect results of the asymmetrical comparison. Further, any incompatibilities between the first and second relational databases are identified based on the asymmetrical comparison, and a forward and backward compatibility of the first and second relational databases is determined based on any identified incompatibilities.

In various embodiments, a method is provided for comparing byte code repositories. The method involves decompiling and filtering a first set of objects from a first byte code repository based on a description of objects to extract and decompiling and filtering a second set of objects from a second byte code repository based on the description of objects to extract. Then a first set of object characterizers are formatted based on the first set of objects. Next, a second set of object characterizers is formed based on the second set of objects. Further, the first and second sets of object characterizers are asymmetrically compared to identify relevant differences between the first and second sets of objects, and any incompatibilities between the first and second byte code repositories are identified based on the asymmetrical comparison.

It is understood that both the foregoing general description and the following description of various embodiments are exemplary and explanatory only and are not restrictive of the invention as claimed. The accompanying drawings, which are incorporated in and constitute a part of this specification, illustrate some embodiments, and together with the description serve to explain the principles of the embodiments described herein.

BRIEF DESCRIPTION OF THE DRAWINGS

The skilled artisan will understand that the drawings, described below, are for illustration purposes only. The drawings are not intended to limit the scope of the present teachings in any way.

DESCRIPTION OF VARIOUS EMBODIMENTS

Reference will now be made in detail to some embodiments, examples of which are illustrated in the accompanying drawings. Wherever possible, the same reference numbers are used throughout the drawings to refer to the same or like parts.

Figure 1:
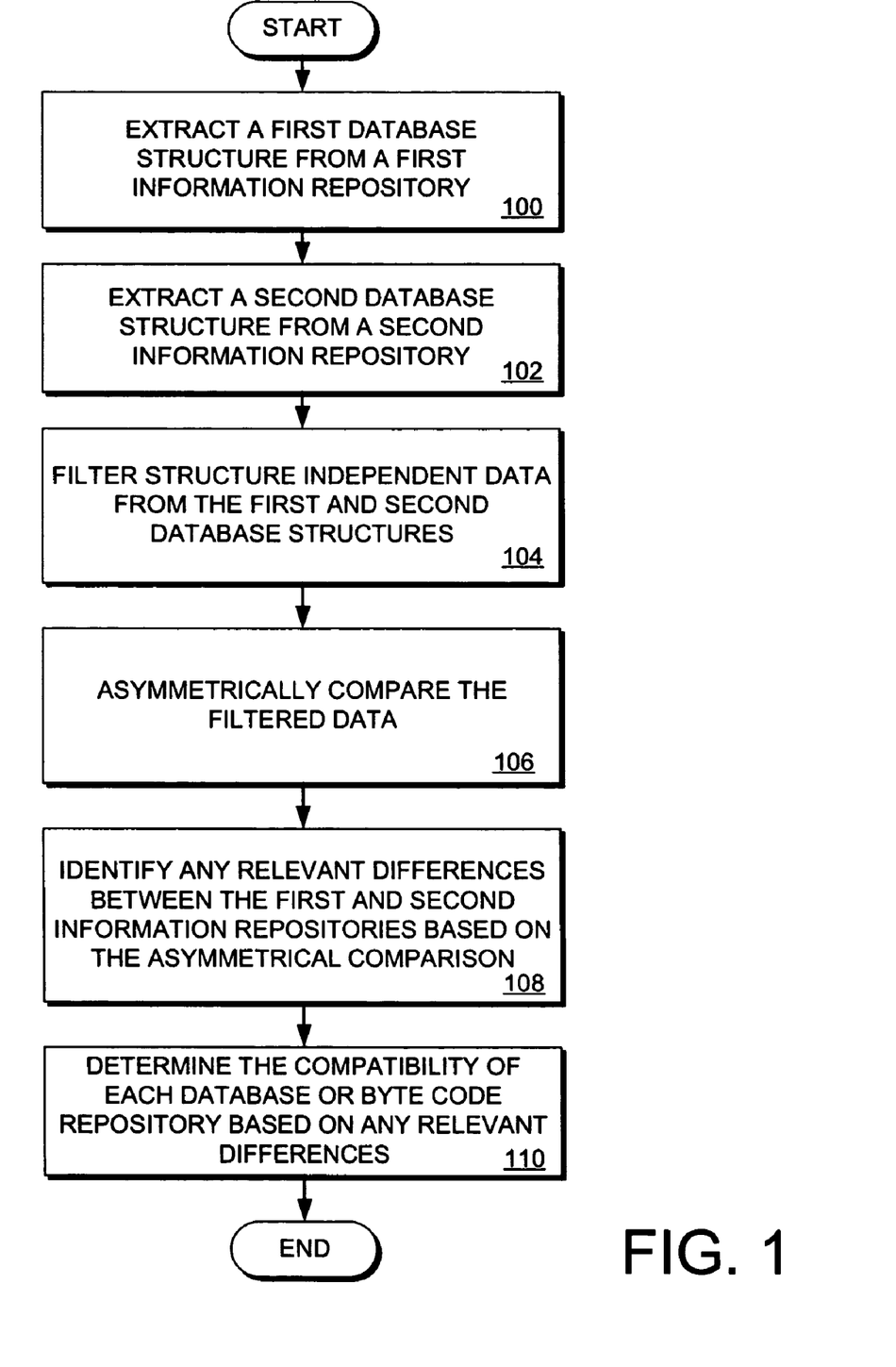
FIG. 1 is a flow chart illustrating an exemplary method for comparing a first database or byte code archive and a second database or byte code archive.

Referring initially to FIG. 1, the present invention involves a computer-implemented method for comparing database structures. Steps 100-110 in FIG. 1 outline an exemplary computer-implemented comparison scheme. The method described herein can be programmed and stored on a device readable by a standard computing device, such as a personal computer or computer network. Suitable program storage devices include, for example, CDs, DVDs, internal computer hard drives, and external network hard drives. Similarly, the method described herein may be executed by a standard computing device or be separately executed by a plurality of computing devices residing on a computing network.

Figure 2:
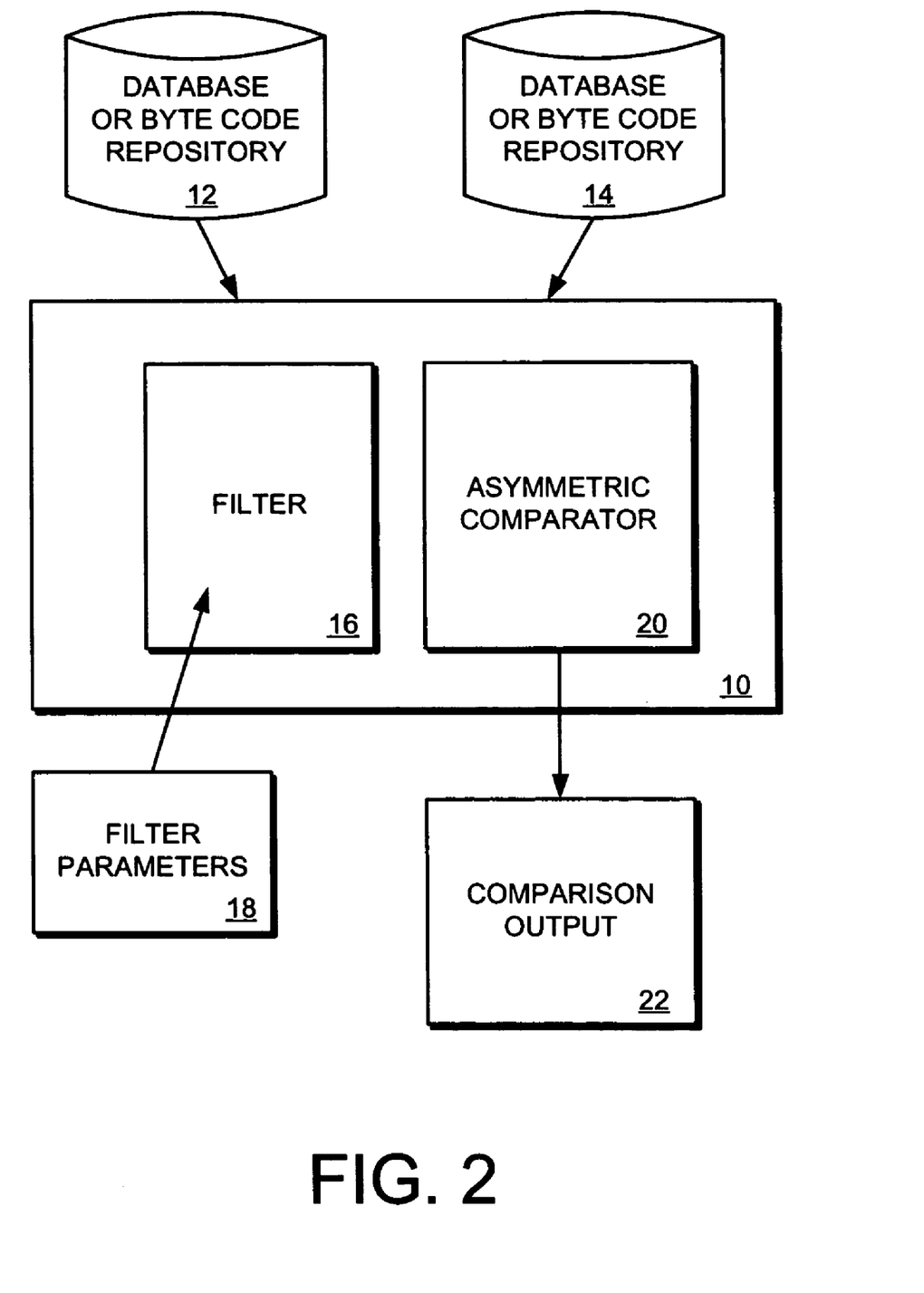
FIG. 2 is a block diagram illustrating computer architecture for performing the method illustrated in FIG. 1.

FIG. 2 illustrates an exemplary computer program for utilization with the present invention. The computer program broadly comprises a database comparison module 10 which is operable to access a first database or byte code repository 12 and a second database or byte code repository 14 for comparison and identification of structural differences between each database or byte code repository 12, 14. The database comparison module 10 may access the databases or byte code repositories 12, 14 through conventional means, such as by accessing locally or remotely stored information. The database comparison module 10 includes a filter module 16 to filter information from the databases or byte code repositories 12, 14 utilizing a set of filter parameters 18. In various embodiments, the filter parameters 18 comprise regular expressions. In various embodiments the filter 16 comprises a schema extractor and regular expression parser that can extract a hierarchical relational database schema into a substantially flat format, for example in an ASCII representation of structured query language (SQL) definitions of the database schema, including a regular expression parser that can separate relevant portions of the SQL definitions from generic or irrelevant portions. In various other embodiments, the filter module 16 comprises a byte code decompiler, and preferably a regular-expression-based decompiler that can extract from a byte code repository only those objects that match, for example, a specific regular expression or set of regular expressions.

The comparison module 10 includes an asymmetric comparator 20 to compare the filtered databases or byte code repositories 12, 14 and to identify structural differences between the databases or byte code repositories 12, 14. The comparison module 10 stores the identified differences or incompatibilities in a computer-readable comparison output 22. In various embodiments, the comparison module 10 performs an asymmetric comparison of relevant portions of two database schemas. In various other embodiments, the comparison module performs an asymmetric comparison of object characterizers relating to various objects in a byte code repository. As used herein "object characterizer" refers generally to a description of the characteristics of an object for purposes such as identifying API compatibility. An "object characterizer" includes but is not limited to an ASCII representation of the names of an objects methods, the number, order, and type of the method's arguments, exceptions thrown, return value type, and method accessibility of the object's methods.

In various embodiments the comparison output is a comparison file. It is understood that the comparison output 22 can be implemented in a number of ways including as an ASCII formatted text file. More detailed operations of the comparison module 10 are described in more detail below. It will be appreciated that the method described herein may be performed by computer programs other than the exemplary database comparison module 10 without departing from the spirit or scope of the present teachings.

Returning to FIG. 1, in steps 100 and 102, the database comparison module 10 accesses the databases or code repositories 12, 14 through any convenient means and extracts a first database structure from the first database or byte code repository 12 and a second database structure from the second database or byte code repository 14. The database structures may be extracted from an existing database, such as the databases or code repositories 12, 14, or the database structures may be otherwise provided such as by accessing a stored database structure which is not extracted from a database. Each database structure includes a plurality of data definition or code sections which describe or define the functionality or operation of the database structure in any convenient format such as in SQL or JAVA programming language representations. In one embodiment, the databases or byte code repositories 12, 14 are DB2 databases and the database structures are data definition languages (DDLs) represented in SQL. In a second embodiment, the databases or byte code repositories 12, 14 are JARs and the database structures are APIs represented in the JAVA programming language.

DB2 is a database management system provided by IBM Corporation. DB2 databases are commonly structured according to DDLs which enable the structure and instances of a database to be defined in a human, and machine-readable form. The DB2 databases utilized by the present invention may include a single DDL or a plurality of DDLs. DDLs include a plurality data definitions allow the definition of tables and associated elements and also include SQL keywords that facilitate the storage, retrieval, comparison, and sorting of data. However, the present teachings may be utilized with any type of database, including unconventional DDL or SQL database structures, and is not limited to database structures as described herein.

A JAR is a library including at least one API upon which various applications can be developed. For instance, a programmer may develop an application by relying on functions provided in a particular API or a plurality of APIs provided in a particular JAR. The JARs utilized in connection with the present teachings may include a single API or a plurality of APIs. Furthermore, each API includes a plurality of objects that enable a desired functionality. Specific JAVA programming language or application functionality provided by a given API or JAR does not limit the scope of the present teachings. Additionally, the present teachings can be utilized with any type of programming language or API and is not limited to conventional or standardized forms as described herein.

In various embodiments, the database structures are preferably extracted from the databases or byte code repositories 12,14 utilizing relational database schema extractors (in the case of relational databases) and decompilers, for example, in the case of JARs. It is understood that other database extractors can be used without departing from the scope of the present teachings, such as decompilers for compiled C#. It is understood that various computer-implemented tools are available to extract DDLs from a DB2 database, such as DB2LOOK from IBM Corporation. Moreover, decompilers are available to extract specific APIs and associated objects from JARs. In various embodiments, the extracted database structures are stored in a computer-readable format such that they are accessible to the comparison module 10 as described below.

In step 104, the extracted database structures are filtered by the filter module 16. Specifically, structure-independent data is filtered from each database structure by identifying relevant data definition or code sections within the database structures and removing generic sections from the database structures. "Structure independent data," as defined herein, is data included within a database structure which is not relevant to the structure of a database or to the forward and backward compatibility of the database to which the database structure corresponds. It will be appreciated that it is common for database structures to include structure independent data to perform various functions unrelated to database structure, such as API-non-specific sections including comments describing the functionality of the database structure, user specific information pertaining only to a specific and unique database implementation, dynamic information relating only to the present state of a specific database, etc.

It is desirable to filter or otherwise remove structure independent data from the extracted database structures to provide a more accurate comparison of the databases or byte code repositories 12, 14 as structure independent data generally varies between database structures even if the database structures are functionally equivalent. For instance, code sections including user specific information and dynamic information are generally specific to a particular database structure and would differ if applied to another functionally equivalent database structure. Thus, the filtering of structure independent data from the extracted database structures allows the functional equivalence of the extracted database structures to be accurately determined.

The database structures are filtered according to the filter parameters 18. In various embodiments the filter parameters 18 are regular expressions that are used to parse the important parts of a database schema, or in the case of API comparison to extract only the relevant objects from the byte code archive with the decompiler. The filter parameters 18 are utilized to identify relevant sections present in each database structure. The identification of relevant sections facilities comparison through, for example regular expressions makes the inventive comparison tools flexible. Thus, the present teachings may be applied to a plurality of information repositories and database structures without expending the time and effort required to generate a custom filter for each specific database structure.

The filter parameters 18 may be automatically provided by the comparison module 10 or may be provided and customized by a user of the module 10. The filter parameters 18 are preferably based on the nature of the data included within the databases 12, 14 and may be dynamically customized by the comparison module 10 or the user after a comparison is preformed to optimize the filter parameters 18 such that a maximum amount of structure independent data is removed from each database structure. For instance, if the results of a comparison are undesirable, such as if the comparison indicates an amount of incompatibilities beyond what is reasonable, the filter parameters may be dynamically customized to filter additional information from each database structure to reduce the amount of incompatibilities to a reasonable amount.

In various embodiments related to database structures associated with relational databases, the filter parameters 18 preferably instruct the filter 16 to identify relevant data definition sections with each DDL, ignoring for example irrelevant data definition sections. The relevant data definition sections can include DDL patterns that are specific to a particular application and not to user customizations, for example. Thus, the relevant data definition sections can include utilized DDL patterns including function, index, table, trigger, unique index, and view elements. The relevant sections may include other or additional data definition sections based on the particular code sections utilized within the DDL.

In various other embodiments related to database structures associated with byte code repositories, the filter parameters 18 preferably instruct the filter 16, which can be implemented as a selective, regular-expression-based byte code decompiler, to identify and extract relevant sections within each APIs. In various embodiments, the regular-expression-based byte code decompiler receives at least one regular expression based on which matching objects are decompiled from the byte code repository. In various embodiments, regular expressions are employed to avoid unnecessary decompilation of irrelevant portions of the byte code repository. In various embodiments, irrelevant sections include: (i) actual semantics in the decompiled methods and/or functions; (ii) API signatures of private methods (i.e. number, order; and types of arguments); (iii) embedded utility classes; (iv) and private data members, for example.

In various embodiments, the relevant sections generally include JAVA programming language elements that relate to the functionality of public aspects of the API. In various embodiments, the relevant code sections typically include JAVA programming language methods, constructors, arguments, order of arguments, argument types, exceptions thrown by the method, return value, and accessibility modifies of the method. The relevant sections may additionally include other or additional JAVA programming language features based on the particular code sections utilized within each API. In various embodiments, the relevant sections are then distilled into object characterizers. In various embodiments the object characterizers correspond to one-line ASCII representations corresponding to the methods, including the method's signature of number of arguments, order of arguments, argument type, exceptions thrown, return value types, and method accessibility.

The filter module 16 identifies and filters out sections of the database structure that have been identified as relevant. The unidentified sections and are not relevant to the forward and backward compatibility of the databases 12, 14.

In various embodiments dealing with database schemas, the irrelevant sections may include embedded white spaces, dynamic database information, SQL sequence numbers, user defined table references, and user defined index references. In various other embodiments related to comparison of byte code repositories, the irrelevant sections may include private functions, or public functions intended to operate as private functions, which are not commonly utilized or accessible by the general public in the API. However, it will be appreciated that the irrelevant sections may include any features or combination of features depending on the filter parameters 18 and the relevant code sections.

The identified structure independent data may either be removed from the extracted database structures or be masked such that the identified structure independent data is not utilized in the comparison, as described below. Thus, the filter module 16 may filter structure independent data from each database structure to suit the needs of a particular user or database, such as masking structure independent data to preserve the original structure of a database or structure or deleting structure independent data when the original structure of a database is not important.

In step 106, the filtered data is compared by the asymmetrical comparator 20 to identify functional differences between the database structures. Specifically, each section of the filtered data is compared to identify code sections which are present in one filtered database structure but not in the other. Filtered database structures that do not include the same sections are not compatible. Additionally, if the databases 12, 14 include more than two databases structures, the additional database structures may be compared in the same manner as described below. Thus, the present invention may compare two or more database structures relating to two or more databases and determine the incompatibilities of each database structure and the forward and backward compatibility of each database.

The asymmetrical comparator 20 differs from conventional computer-assisted comparison methods, such as the Unix tools diff and comp, and the Windows tools fc and WINDIFF, in that the specific location of code sections within each database structure does not effect an asymmetrical comparison but does effect a conventional comparison. For instance, utilizing conventional comparison methods, if a first database structure includes code section A on line 1, and a second database structure includes code section A on line 2, code section A will be identified by the conventional comparison method as a structural difference between the first and second database structure, even through code section A is common to both structures and both structures are functionally equivalent. In contrast, asymmetrical comparison, such as the comparison utilized by the comparator 20, would not identify code section A as a difference between the database structures and would identify the two databases as functionally equivalent.

Asymmetric comparison utilizes the relationship between elements, such as elements within a database structure, to determine if two elements are equal. In contrast, conventional comparison methods merely compare two database structures line-by-line or byte by byte to determine where the structures differ. For example, in an asymmetric comparison, if a first database structure includes section X, and a second database structure includes code section Y, X equals Y if X (R) Y and Y (R) X, where (R) is a relation such as greater than, less than, etc., regardless of the location of X and Y within the database structures. Thus, the specific location, such as line number or character position of code sections X and Y within the database structures does not effect the comparison. It will be appreciated that the exemplary code sections X and Y may be a singular element, or a plurality of elements such as a plurality of data definition sections, a function block, or a class structure. In various embodiments, the asymmetrical comparison is performed using set operation methods provided in connection with the JAVA programming language. But it is understood that any asymmetrical comparison operations can be employed without departing from the spirit or scope of the present teachings.

Preferably, the comparator 20 compares each code section within the first database structure to each code section within the second database structure to determine if the elements are the same. As a result, the specific ordering or position of each element within the database structures does not effect the results of the comparison as the ordering of the elements is not utilized in the asymmetrical comparison of the database structures.

In step 108, incompatibilities between the databases 12, 14 are identified based on code sections that are present in one database structure but not the other. Sections that are present in one database structure but not in the other are stored in the comparison file 22 as incompatibilities. In addition to storing the identified incompatibles, the comparison file 22 also provides the specific incompatibilities of each database structure by indicating the various elements or code sections each database structure lacks. For instance, if a first database includes code section A and a second database lacks code section A, the comparison file 22 would indicate code section A as an incompatibility of the second database. Similarly, if more than two database structures or more than two databases are compared, the specific incompatibilities of each database structure are also provided.

In step 110, the compatibility of each database 12, 14 is determined based on the identified incompatibilities. The database 12 is compatible with the database 14, and vice versa, when the database 12 includes database structures having code sections that are also contained within the database 14. The forward and backward compatibility of each database 12,14 depends on the sequence of the databases 12, 14. For example, if the database 12 includes each code section present in the database 14, the database 12 is backward compatible with database 14 and the database 14 is forward compatible with database 12. In situations where multiple databases are compared, a similar hierarchy of forward and backward compatibility may be established based on the various incompatibilities of each database.

The identified incompatibilities stored within the comparison file 22 may be sorted or otherwise categorized such that a user or other computer program may easily determine the forward and backward compatibility of the compared database structures. For example, a table or grid may be assembled and stored in a computer-readable format to illustrates the forward and backward compatibility of each compared database by indicating the common and unique database structures or code sections of each database structure.

The comparison file 22 may also be utilized to modify an incompatible database structure such that the incompatible database structure properly functions with a desired database. For instance, if a updated database version is to replace a previous database version, but the updated database version lacks code section A within its structure, the comparison file 22 would indicate as such and code section A may be easily added to the updated database version such that databases or applications which functioned under the previous database version will function under the updated database version.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

The invention claimed is:

1. A method for comparing database structures, the method comprising:
    extracting a first database structure from a first relational database, the first database structure comprising a first plurality of data definitions defining operation of the first database structure and descriptions of a relational database schema of the first database structure;
    extracting a second database structure from a second relational database, the second database structure comprising a second plurality of data definitions defining operation of the second database structure and descriptions of a relational database schema of the second database structure;
    filtering the first database structure and the second database structure;
    asymmetrically comparing the filtered first database structure with the filtered second database structure resulting in an asymmetrical comparison; and
    identifying differences relevant to forward and backward compatibility between the first information repository and the second information repository based on the asymmetrical comparison;
    wherein the relational database schema of the first database structure and the relational database schema of the second database structure are extracted utilizing a relational database schema extractor;
    wherein the asymmetrically comparing the filtered first database structure with the filtered second database structure comprises utilizing relationships between filtered elements in the first database structure with filtered elements of the second database structure to determine differences in structure between the first database structure and the second database structure;
    wherein filtering the first database structure and the second database structure further comprises decompiling byte codes associated with the first relational database and the second relational database based upon at least one regular expression.

2. The method of claim 1, wherein filtering the first database structure and the second database structure further comprises extracting a first database schema corresponding to the first relational database and a second database schema corresponding to the second relational database and parsing the first database schema and the second database schema based on at least one regular expression.

3. The method of claim 1, wherein the filtering step further comprises removing structure independent data from the first database structure and the second database structure.

4. The method of claim 3, wherein the structure independent data includes sections irrelevant to forward and backward compatibility.

5. The method of claim 1, wherein the filtering step further comprises filtering data relevant to forward and backward compatibility out of the first database structure and the second database structure.

6. The method of claim 3, wherein the structure independent data includes embedded white spaces, dynamic database information, SQL sequence numbers, user defined table references, and user defined index references.

7. The method of claim 3, wherein the structure independent data is removed by identifying data sections relevant to forward and backward compatibility within the first database structure and the second database structure and removing the remaining data sections irrelevant to forward and backward compatibility from the first database structure and the second database structure.

8. The method of claim 3, wherein the structure independent data comprises SQL statements including function, index, table, trigger, unique index, and view elements.

9. The method of claim 3, wherein the structure independent data comprises JAVA programming language methods, class constructors, arguments, order of arguments, argument types, exceptions thrown by the JAVA programming language methods, return values, and accessibility modifiers of the JAVA programming language methods.

10. The method of claim 3, wherein a definition of the structure independent data is customizable such that a user may specify a regular expression to use in the filtering step.

11. The method of claim 1, wherein the first and second database structures include at least one data section relevant to forward and backward compatibility.

12. The method of claim 11, wherein the asymmetrical comparison includes comparing the data sections relevant to forward and backward compatibility of the first database structure and the second database structure.

13. The method of claim 12, wherein a position of the data sections relevant to forward and backward compatibility within the first database structure and the second database structure does not result in identification of a difference relevant to forward and backward compatibility in the asymmetrical comparison.

14. The method of claim 12, further including determining forward and backward compatibility of the first relational database and the second relational database based on the compared data sections relevant to forward and backward compatibility.

15. A method for comparing database structures, the method comprising:
    extracting a first relational database schema from a first relational database, the first relational database schema including a first plurality of sections comprising a first plurality of data definitions which define operation of the first schema;
    extracting a second relational database schema from a second relational database, the second relational database schema including a second plurality of sections comprising a second plurality of data definitions which define operation of the second schema;
    filtering relevant data from the first schema and from the second schema by identifying sections relevant to forward and backward compatibility within the first schema and within the second schema and disregarding any sections irrelevant to forward and backward compatibility;

asymmetrically comparing the identified relevant sections of the first schema and of the second schema to identify differences relevant to forward and backward compatibility included within one of the first schema and the second schema but not another, wherein a position of the relevant sections within the first schema and within the second schema does not effect results of the asymmetrical comparison;

identifying any incompatibilities between the first relational database and the second relational database based on the asymmetrical comparison; and determining a forward and backward compatibility of the first relational database and of the second relational database based on any identified incompatibilities; wherein the first relational database schema and the second relational database schema are extracted utilizing a relational database schema extractor;

wherein the asymmetrically comparing the identified relevant sections of the first schema with the second schema comprises utilizing relationships between filtered elements in the first schema with filtered elements of the second schema to determine differences in structure between the first schema and the second schema;

wherein filtering the first database structure and the second database structure further comprises decompiling byte codes associated with the first relational database and the second relational database based upon at least one regular expression.

16. The method of claim 15, wherein the relevant sections comprise SQL statements corresponding to stored procedures, indices, tables, triggers, unique indices, and views.

17. The method of claim 15, wherein the irrelevant sections include embedded white spaces, dynamic database information, SQL sequence numbers, user defined table references, and user defined index references.

18. The method of claim 15, wherein a description of the relevant sections is customizable using at least one regular expression.

19. The method of claim 15, further comprising storing the identified incompatibilities in a computer-readable format.

20. The method of claim 15, further comprising presenting the determined forward and backward compatibility of the first and second relational databases in a computer-readable format.

21. The method according to claim 1, wherein the differences relevant to forward and backward compatibility comprise JAVA elements related to functionality of public aspects of an application programming interface.

22. The method according to claim 1, wherein the asymmetrically comparing the filtered first database structure with the filtered second database structure does not compare the first database structure with the second database structure line-by-line or byte-by-byte to determine differences in structure between the first database structure and the second database structure.

23. The method according to claim 1, wherein the first database structure is backward compatible with the second database structure when the first database structure comprises each code section present in the second database structure; and wherein the second database structure is forward compatible with the first database when the second database structure includes each code section present in the first database structure.

24. A computer-readable storage medium containing a set of instructions for a general purpose computer having a user interface, the set of instructions comprising:

a control routine operatively associated with the user interface, the control routine providing control operations for comparing relational databases;

a first extraction routine operatively associated with the control routine, the first extraction routine providing extraction of a first database structure from a first relational database;

a second extraction routine operatively associated with the control routine, the second extraction routine providing extraction of a second database structure from a second relational database;

a filtering routine operatively associated with the user interface, the first extraction routine and the second extraction routine providing filtering of the first database structure and the second database structure;

an asymmetrical comparison routine operatively associated with the filtering routine providing an asymmetrical comparison of the filtered first database structure with the filtered second database structure; and an identification routine operatively associated with the asymmetrical comparison routine providing identification of differences relevant to forward and backward compatibility between the first information repository and the second information repository based on the asymmetrical comparison;

wherein the first database structure and the second database structure are extracted utilizing a relational database schema extractor; and wherein the asymmetrical comparison of the filtered first database structure with the filtered second database structure comprises utilizing relationships between filtered elements in the first database structure with filtered elements of the second database structure to determine differences in structure between the first database structure and the second database structure;

wherein the filtering routine further comprises a decompilation routine providing a decompilation of byte codes associated with the first relational database and the second relational database based upon at least one regular expression.

25. The computer-readable storage medium of claim 24, wherein the filtering routine further comprises an extraction and parsing routine that provides an extraction of a first database schema corresponding to the first relational database and a second database schema corresponding to the second relational database and that parses the first database schema and the second database schema based on at least one regular expression.

26. A computer-readable storage medium containing a set of instructions for causing a general purpose computer to perform a database comparison, the general purpose computer having a user interface, and the set of instructions comprising:

a database comparison control routine operatively coupled with the user interface;

a first extraction routine operatively coupled with the database comparison control routine providing extraction of a first schema from a first relational database, the first schema including a first plurality of sections relevant to forward and backward compatibility;

a second extraction routine operatively coupled with the database comparison control routine providing extraction of a second schema from a second relational database, the second schema including a second plurality of sections relevant to forward and backward compatibility;

a filtering routine, operatively coupled with the database comparison control routine, the first extraction routine, and the second extraction routine, providing filtering of relevant data from the first schema and from the second schema by identifying sections relevant to forward and backward compatibility within the first schema and within the second schema and disregarding any sections irrelevant to forward and backward compatibility;

an asymmetrical comparison routine operatively coupled with the filtering routine providing an asymmetrical comparison of the identified relevant sections of the first schema and of the second schema to identify differences relevant to forward and backward compatibility included within only one of the first schema and the second schema, wherein a position of the relevant sections within the first schema and within the second schema does not effect results of the asymmetrical comparison; and an identification routine operatively coupled with the asymmetrical comparison routine providing an identification of any incompatibilities between the first relational database and the second relational database based on the asymmetrical comparison;

wherein the first schema and the second schema are extracted utilizing a relational database schema extractor; and wherein the asymmetrical comparison of the identified relevant sections of the first schema with the second schema comprises utilizing relationships between filtered elements in the first schema with filtered elements of the second schema to determine differences in structure between the first schema and the second schema;

wherein the filtering routine further comprises a decompilation routine providing a decompilation of byte codes associated with the first relational database and the second relational database based upon at least one regular expression.

27. The computer-readable storage medium of claim 26 further comprising a compatibility determination routine operatively coupled with the identification routine providing a determination of a forward and backward compatibility of the first relational database and of the second relational database based on an output from the identification routine.

* * * * *